(12) United States Patent
Arai et al.

(10) Patent No.: US 8,461,264 B2
(45) Date of Patent: Jun. 11, 2013

(54) THERMOPLASTIC RESIN COMPOSITION

(75) Inventors: Toru Arai, Machida (JP); Masaru Hasegawa, Machida (JP); Akira Miyama, Machida (JP); Kunihiko Konishi, Ichihara (JP); Shigeru Suzuki, Ichihara (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/988,101

(22) PCT Filed: Apr. 14, 2009

(86) PCT No.: PCT/JP2009/057497
§ 371 (c)(1),
(2), (4) Date: Oct. 15, 2010

(87) PCT Pub. No.: WO2009/128444
PCT Pub. Date: Oct. 22, 2009

(65) Prior Publication Data
US 2011/0040038 A1  Feb. 17, 2011

(30) Foreign Application Priority Data

Apr. 15, 2008 (JP) ................. 2008-105606
Jul. 2, 2008 (JP) ................. 2008-172868
Nov. 27, 2008 (JP) ................. 2008-301947

(51) Int. Cl.
*C08L 71/12* (2006.01)
*C08F 297/06* (2006.01)
*C08F 4/64* (2006.01)

(52) U.S. Cl.
USPC .......... 525/152; 525/132; 525/242; 525/268; 525/905; 428/66.4

(58) Field of Classification Search
USPC .......... 525/152, 905, 132, 242, 268; 428/66.4
See application file for complete search history.

(56) References Cited

U.S. PATENT DOCUMENTS

| | | | |
|---|---|---|---|
| 5,559,186 A * | 9/1996 | Fujii et al. ............... | 525/68 |
| 5,883,213 A | 3/1999 | Arai et al. | |
| 6,066,709 A | 5/2000 | Arai et al. | |
| 6,093,771 A * | 7/2000 | Wunsch et al. ........... | 525/63 |
| 6,201,067 B1 | 3/2001 | Cheung et al. | |
| 6,235,855 B1 | 5/2001 | Arai et al. | |
| 6,248,850 B1 | 6/2001 | Arai | |
| 6,329,479 B1 | 12/2001 | Arai et al. | |
| 6,348,556 B1 | 2/2002 | Arai et al. | |
| 6,410,649 B1 | 6/2002 | Oda et al. | |
| 6,410,673 B1 | 6/2002 | Arai et al. | |
| 6,417,308 B2 | 7/2002 | Arai et al. | |
| 6,472,490 B1 | 10/2002 | Arai et al. | |
| 6,489,424 B2 | 12/2002 | Arai et al. | |
| 6,559,234 B1 | 5/2003 | Arai et al. | |
| 6,566,453 B1 | 5/2003 | Arai et al. | |
| 6,630,215 B1 | 10/2003 | Oda et al. | |
| 6,803,422 B2 | 10/2004 | Arai et al. | |
| 6,878,779 B2 | 4/2005 | Arai et al. | |
| 6,891,004 B2 | 5/2005 | Arai et al. | |
| 6,894,102 B2 * | 5/2005 | Merfeld ................ | 524/494 |
| 7,022,794 B2 | 4/2006 | Arai et al. | |
| 7,214,745 B2 | 5/2007 | Arai et al. | |
| 2003/0096926 A1 | 5/2003 | Arai et al. | |
| 2004/0147681 A1 | 7/2004 | Arai et al. | |
| 2009/0263604 A1 | 10/2009 | Arai et al. | |

FOREIGN PATENT DOCUMENTS

| | | |
|---|---|---|
| EP | 0 209 874 | 1/1987 |
| JP | 53 71158 | 6/1978 |
| JP | 54 88960 | 7/1979 |
| JP | 59 100159 | 6/1984 |
| JP | 8 3001 | 1/1996 |
| JP | 11 181272 | 7/1999 |
| JP | 11 189690 | 7/1999 |
| JP | 11 199716 | 7/1999 |
| JP | 2000 178388 | 6/2000 |
| JP | 2000 198918 | 7/2000 |
| JP | 2002-265720 | 9/2002 |
| JP | 2002 533478 | 10/2002 |
| WO | 00 37517 | 6/2000 |
| WO | 2007 139116 | 12/2007 |

OTHER PUBLICATIONS

Machine translation of JP 2002-265720; pub. date: Sep. 2002.*
Extended European Search Report issued on Aug. 5, 2011 in the corresponding European Application No. 09732560.9.
International Search Report issued Jul. 21, 2009 in PCT/JP09/57497 filed Apr. 14, 2009.
U.S. Appl. No. 09/588,579, filed Jun. 7, 2000, Otsu, et al.
U.S. Appl. No. 09/581,247, filed Jun. 26, 2000, Arai, et al.

* cited by examiner

*Primary Examiner* — Fred M Teskin
(74) *Attorney, Agent, or Firm* — Oblon, Spivak, McClelland, Maier & Neustadt, L.L.P.

(57) ABSTRACT

Disclosed is a thermoplastic resin composition comprising a cross-copolymer which meets specific requirements; and a polyphenylene ether resin, wherein the cross-copolymer is contained in an amount of 5 to 95 mass % and the polyphenylene ether resin is contained in an amount of 95 to 5 mass %. The thermoplastic resin composition has excellent heat resistant, excellent softness, excellent flexibility, excellent stretching properties, and excellent scratch-abrasion resistance.

11 Claims, 1 Drawing Sheet

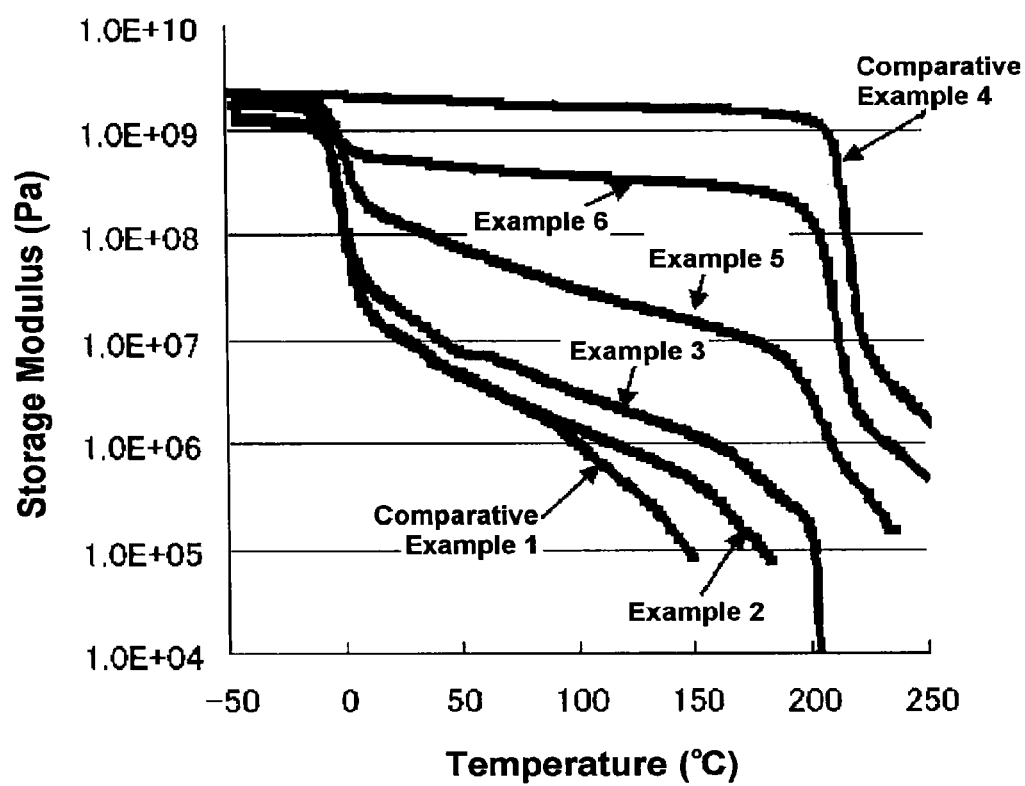

US 8,461,264 B2

THERMOPLASTIC RESIN COMPOSITION

This application is a 371 of PCT/JP2009/057497 filed Apr. 14, 2009. Priority to Japanese patent application Nos. 2008-105606, filed Apr. 15, 2008; 2008-172868, filed Jul. 2, 2008, and 2008-301947, filed Nov. 27, 2008, is claimed.

TECHNICAL FIELD

The present invention relates to a thermoplastic resin composition excelling in heat resistance, softness, flexibility, elongation and scratch-abrasion resistance.

BACKGROUND ART

Polyphenylene ethers (hereafter abbreviated to PPE), also known as polyphenylene oxides, are heat resistant thermoplastic engineered resins having a high glass transition temperature. In order to improve the moldability, flexibility and elongation of PPE's, they are often used as compositions combined with styrenic resins such as high-impact polystyrenes (modified PPE's), or as compositions combined with elastomers.

Examples of elastomers that can be blended with PPE's include styrenic elastomers such as styrene-butadiene random copolymers, styrene-butadiene block copolymers, styrene-isoprene block copolymers, hydrogenated styrene-butadiene block copolymers (such as SEBS), hydrogenated styrene-isoprene block copolymers (such as SEPS), and α-olefin elastomers such as ethylene-α-olefin copolymers. The blending of styrenic elastomers with PPE's is a widely known technique for softening and improving the impact resistance of PPE's, which is commonly known in the relevant field (Patent Documents 1-4). Among these techniques, those involving non-hydrogenated copolymers of butadiene or isoprene with styrene have poor weather resistance and stability with respect to heat and light, due to the presence of double bonds in the main chain. Additionally, ethylene-α-olefin copolymers have poor compatibility with PPE's. For this reason, hydrogenated block copolymers including hydrogenated styrene-butadiene block copolymers (such as SEBS) and hydrogenated styrene-isoprene block copolymers (such as SEPS) are often employed as compatibilizers. However, the processing required of hydrogenated copolymers (such as SEBS and SEPS) can make them expensive, so there has been a demand for materials not requiring hydrogenation.

In view thereof, resin compositions blending ethylene-styrene (aromatic vinyl compounds) copolymers with polyphenylene ether resins have been considered (Patent Documents 5-9).

However, ethylene-styrene copolymers are statistical copolymers (so-called random copolymers) whose copolymerization is expressed by Bernoulli, first-order and second-order Markov statistics. Therefore, soft copolymers having a low styrene content may have inadequate compatibility with polyphenylene ethers, as a result of which sufficient heat resistance may not be achieved. On the other hand, if the styrene content is high, the glass transition temperature may be close to room temperature, in which case the softness may be inadequate. Thus, resin compositions that are satisfactory in both heat resistance and softness have not been able to be obtained by blending ethylene-styrene (aromatic vinyl compounds) copolymers with polyphenylene ether resins.

On the other hand, as thermoplastic resins aside from polyphenylene ether resins, a method of copolymerizing small quantities of divinylbenzene to ethylene-styrene copolymers and introducing heterologous polymer chains (cross chains) via vinyl groups in the divinylbenzene units, in other words, methods of producing so-called cross-copolymers, and the cross-copolymers obtained by such methods, have been proposed (Patent Documents 10 and 11). Cross-copolymers having polystyrenes as cross chains obtained by the present method can be made to have heat resistance up to near the glass transition temperature of polystyrene (about 100° C.), while retaining the excellent properties of styrene-ethylene copolymers as thermoplastic elastomers. However, there has been a desire for resin compositions capable of further improving their heat resistance while retaining the excellent thermoplastic elastomer properties of cross-copolymers.

Patent Document 1: JP S53-71158 A
Patent Document 2: JP S54-88960 A
Patent Document 3: JP S59-100159 A
Patent Document 4: EP 0 209 874 B1
Patent Document 5: JP H11-181272 A
Patent Document 6: JP 2002-533478 T
Patent Document 7: JP 2000-178388 A
Patent Document 8: JP 2000-198918 A
Patent Document 9: JP H8-3001 B
Patent Document 10: WO 00/37517
Patent Document 11: WO 2007/139116

SUMMARY OF THE INVENTION

The present invention was conceived in consideration of the above-described circumstances, and has the purpose of offering a thermoplastic resin composition excelling in heat resistance, softness, flexibility, elongation and scratch-abrasion resistance.

As a result of diligent research, the present inventors discovered that a thermoplastic resin containing 5-95 mass % of a cross-copolymer satisfying certain conditions and 95-5 mass % of a polyphenylene ether resin exhibits excellent heat resistance, softness, flexibility, elongation and scratch-abrasion resistance compared to resin compositions containing cross-copolymers or polyphenylene ether resins alone.

In other words, the thermoplastic resin composition of the present invention is a thermoplastic resin composition comprising 5-99 mass % of a cross-copolymer, and 95-1 mass % of a polyphenylene ether resin; and satisfying the following conditions (1) to (4):

(1) being produced by a production method comprising a coordination polymerization step of performing copolymerization of an olefin monomer, an aromatic vinyl compound monomer and an aromatic polyene using a single-site coordination polymerization catalyst to synthesize an olefin-aromatic vinyl compound-aromatic polyene copolymer, and a cross-polymerization step of using an anionic polymerization initiator or radical polymerization initiator to polymerize the synthesized olefin-aromatic vinyl compound-aromatic polyene copolymer with an aromatic vinyl compound monomer;

(2) the composition of the olefin-aromatic vinyl compound-aromatic polyene copolymer obtained in the coordination polymerization step being such as to have an aromatic vinyl compound content of at least 5 mol % and at most 40 mol %, and an aromatic polyene content of at least 0.01 mol % and at most 0.3 mol %, the balance being olefin content;

(3) the single-site coordination polymerization catalyst used in the coordination polymerization step being constituted of a co-catalyst and a transition metal compound represented by the following general formula (1):

[Chem 1]

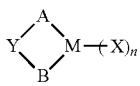

general formula (1)

wherein,
A and B may be identical or different, and are groups chosen from among non-substituted or substituted benzoindenyl groups, non-substituted or substituted indenyl groups, non-substituted or substituted cyclopentadienyl groups and non-substituted or substituted fluorenyl groups;
Y is a methylene group having bonds with A and B, and also having, as substituent groups, a hydrogen or hydrocarbon group (possibly including 1-3 nitrogen, oxygen, sulfur, phosphorus or silicon atoms) having 1-15 carbon atoms, the substituent groups possibly being identical or different, and Y possibly having a cyclic structure;
X is a hydrogen, a hydroxyl group, a halogen, a hydrocarbon group having 1-20 carbon atoms, an alkoxy group having 1-20 carbon atoms, a silyl group having a hydrocarbon substituent group with 1-4 carbon atoms, or an amido group having a hydrocarbon substituent group with 1-20 carbon atoms, and if there are a plurality of X's, the X's may be bonded together;
n is the integer 1 or 2; and
M is zirconium, hafnium or titanium;
or by the following general formula (2):

[Chem 2]

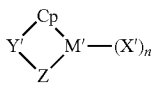

general formula (2)

wherein,
Cp is a group chosen from among non-substituted or substituted cyclopentaphenanthryl groups, non-substituted or substituted benzoindenyl groups, non-substituted or substituted cyclopentadienyl groups, non-substituted or substituted indenyl groups, and non-substituted or substituted fluorenyl groups;
Y' is a methylene group, a silylene group, an ethylene group, a germylene group or a boron residue having bonds with Cp and Z, and also having a hydrogen or a hydrocarbon group with 1-15 carbon atoms, the substituent groups possibly being identical or different, and Y' possibly having a cyclic structure;
Z is a ligand comprising nitrogen, oxygen or sulfur, coordinated with M' via the nitrogen, oxygen or sulfur, having a bond with Y' and also having a hydrogen or a substituent group with 1-15 carbon atoms;
M' is zirconium, hafnium or titanium;
X' is a hydrogen, a halogen, an alkyl group having 1-15 carbon atoms, an aryl group having 6-10 carbon atoms, an alkylaryl group having 8-12 carbon atoms, a silyl group having a hydrocarbon substituent group with 1-4 carbon atoms, an alkoxy group having 1-10 carbon atoms, or a dialkylamido group having an alkyl substituent group with 1-6 carbon atoms; and
n is an integer 1 or 2; and (4) the proportion by mass of the olefin-aromatic vinyl compound-aromatic polyene copolymer obtained in the coordination polymerization step with respect to the cross-copolymer obtained in the cross-copolymerization step being 50-95 mass %.

The thermoplastic resin composition of the present invention exhibits excellent rigidity and elongation in comparison to conventional polphenylene ether resins, and exhibits greatly improved heat resistance while maintaining and improving its properties as a thermoplastic elastomer, such as softness, mechanical properties and scratch-abrasion resistance in comparison to conventional styrene-ethylene copolymers and cross-copolymers. Thus, the thermoplastic resin composition of the present invention exhibits excellent properties in terms of its heat resistance, softness, flexibility elongation and scratch-abrasion resistance.

BRIEF DESCRIPTION OF THE DRAWINGS

The viscoelastic spectra of the compositions obtained in Examples 2, 3, 5 and 6, and Comparative Examples 1 and 4 are shown in the drawing.

MODES FOR CARRYING OUT THE INVENTION

Herebelow, modes for carrying out the present invention shall be explained in detail.

The thermoplastic resin composition of the present invention is a thermoplastic resin composition comprising 5-99 mass % of a cross-copolymer, and 95-1 mass % of a polyphenylene ether resin; and satisfying the following conditions (1) to (4):

(1) being produced by a production method comprising a coordination polymerization step of performing copolymerization of an olefin monomer, an aromatic vinyl compound monomer and an aromatic polyene using a single-site coordination polymerization catalyst to synthesize an olefin-aromatic vinyl compound-aromatic polyene copolymer, and a cross-polymerization step of using an anionic polymerization initiator or radical polymerization initiator to polymerize the synthesized olefin-aromatic vinyl compound-aromatic polyene copolymer with an aromatic vinyl compound monomer;

(2) the composition of the olefin-aromatic vinyl compound-aromatic polyene copolymer obtained in the coordination polymerization step being such as to have an aromatic vinyl compound content of least 5 mol % and at most 40 mol %, an aromatic polyene content at least 0.01 mol % and at most 0.3 mol %, the balance being olefin content;

(3) the single-site coordination polymerization catalyst used in the coordination polymerization step being constituted of a co-catalyst and a transition metal compound represented by the following general formula (1):

[Chem 3]

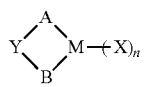

general formula (1)

wherein,
A and B may be identical or different, and are groups chosen from among non-substituted or substituted benzoindenyl groups, non-substituted or substituted indenyl groups, non-substituted or substituted cyclopentadienyl groups and non-substituted or substituted fluorenyl groups;

Y is a methylene group having bonds with A and B, and also having, as substituent groups, a hydrogen or hydrocarbon group (possibly including 1-3 nitrogen, oxygen, sulfur, phosphorus or silicon atoms) having 1-15 carbon atoms, the substituent groups possibly being identical or different, and Y possibly having a cyclic structure;

X is a hydrogen, a hydroxyl group, a halogen, a hydrocarbon group having 1-20 carbon atoms, an alkoxy group having 1-20 carbon atoms, a silyl group having a hydrocarbon substituent group with 1-4 carbon atoms, or an amido group having a hydrocarbon substituent group with 1-20 carbon atoms, and if there are a plurality of X's, the X's may be bonded together;

n is the integer 1 or 2; and

M is zirconium, hafnium or titanium; or by the following general formula (2):

[Chem 4]

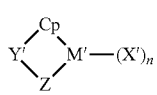

general formula (2)

wherein,

Cp is a group chosen from among non-substituted or substituted cyclopentaphenanthryl groups, non-substituted or substituted benzoindenyl groups, non-substituted or substituted cyclopentadienyl groups, non-substituted or substituted indenyl groups, and non-substituted or substituted fluorenyl groups;

Y' is a methylene group, a silylene group, an ethylene group, a germylene group or a boron residue having bonds with Cp and Z, and also having a hydrogen or a hydrocarbon group with 1-15 carbon atoms, the substituent groups possibly being identical or different, and Y' possibly having a cyclic structure;

Z is a ligand comprising nitrogen, oxygen or sulfur, coordinated with M' via the nitrogen, oxygen or sulfur, having a bond with Y' and also having a hydrogen or a substituent group with 1-15 carbon atoms;

M' is zirconium, hafnium or titanium;

X' is a hydrogen, a halogen, an alkyl group having 1-15 carbon atoms, an aryl group having 6-10 carbon atoms, an alkylaryl group having 8-12 carbon atoms, a silyl group having a hydrocarbon substituent group with 1-4 carbon atoms, an alkoxy group having 1-10 carbon atoms, or a dialkylamido group having an alkyl substituent group with 1-6 carbon atoms; and n is an integer 1 or 2; and (4) the proportion by mass of the olefin-aromatic vinyl compound-aromatic polyene copolymer obtained in the coordination polymerization step with respect to the cross-copolymer obtained in the cross-copolymerization step being 50-95 mass %.

While cross-copolymers are usually thought of as having a structure wherein a polymer chain consisting of an aromatic vinyl compound monomer forming the cross chain is bonded via a main-chain aromatic polyene unit to an olefin-aromatic vinyl compound-aromatic polyene copolymer forming the main chain (cross-copolymer structure or segregated star copolymer structure), the cross-copolymer in the present specification is not limited to such a structure, and shall be defined as including all copolymers obtainable by the production methods described below.

While the MFR value of the cross-copolymer is not particularly limited, it should normally be at least 0.01 g/10 minutes and at most 300 g/10 minutes, measured at 200° C. and at a load of 98 N.

Examples of olefins that can be used in the coordination polymerization step during production of the cross-copolymer include ethylene, α-olefins having 3-20 carbon atoms such as propylene, 1-butene, 1-hexene, 4-methyl-1-pentene, 1-octene and vinylcyclohexane, and cyclic olefins such as cyclopentene and norbornene. Preferably, ethylene or a mixture between ethylene and an α-olefin such as propylene, 1-butene, 1-hexene or 1-octene is used, and more preferably, ethylene is used.

Examples of aromatic vinyl compound monomers that can be used in the coordination polymerization step include styrene and various substituted styrenes such as p-methylstyrene, m-methylstyrene, o-methylstyrene, o-t-butylstyrene, m-t-butylstyrene, p-t-butylstyrene, p-chlorostyrene and o-chlorostyrylene. From an industrial standpoint, styrene, p-methylstyrene and p-chlorostyrene are preferable, and styrene is more preferable.

The aromatic polyenes used in the coordination polymerization step are aromatic polyenes having at least 10 and at most 30 carbon atoms, having a plurality of double bonds (vinyl groups) and one or more aromatic groups, one of the double bonds (vinyl groups) being used in coordination polymerization and left in the polymerized state being capable of anionic polymerization or radical polymerization. Preferably, one or a mixture of two or more of ortho-divinylbenzene, para-divinylbenzene and meta-divinylbenzene should be used.

A cross-copolymer having particularly good softness can be obtained if the composition of the olefin-aromatic vinyl compound-aromatic polyene copolymer which is the main chain obtained by the coordination polymerization step satisfies the conditions of at least 5 mol % and at most 40 mol % for aromatic vinyl compound content and at least 0.01 mol % and at most 0.3 mol % for aromatic polyene content. While the composition of the olefin-aromatic vinyl compound-aromatic polyene copolymer can be controlled to within the above range by general publicly known methods, this can be achieved most easily by changing the added monomer composition ratio.

If the composition of the above-mentioned olefin-aromatic vinyl compound-aromatic polyene copolymer is such that the aromatic vinyl compound content is less than 5 mol %, then there can be more than a certain level of crystal structures based, for example, on ethylene chains or propylene chains, thereby reducing the softness of the finally obtained resin composition, and further reducing the dimensional stability of the molded article due to contraction by crystallization when molding. The total crystal fusion heat including the olefin crystallinity and other types of crystallinity when in cross-copolymer form should be 50 J/g or less, preferably 30 J/g or less. The total crystal fusion heat can be determined by DSC from the sum of the areas of the peaks originating at the melting point observed in the range of 50° C. to about 200° C.

If the composition of the above-mentioned olefin-aromatic vinyl compound-aromatic polyene copolymer is such that the aromatic vinyl compound content exceeds 40 mol %, then the glass transition temperature may rise to near room temperature, for example, to more than 10° C., in which case the softness and cold resistance will be lost. Furthermore, as long as the composition of the olefin-aromatic vinyl compound-aromatic polyene copolymer obtained in the coordination polymerization step satisfies conditions of an aromatic vinyl compound content of at least 15 mol % and at most 35 mol % and an aromatic polyene content of at least 0.01 mol % and at most 0.3 mol %, with the balance being olefin content, a resin composition excelling in softness and cold resistance can be obtained.

Furthermore, the aromatic polyene content of the olefin-aromatic vinyl compound-aromatic polyene copolymer obtained in the coordination polymerization step should be at least 0.01 mol % and at most 0.3 mol %, preferably at least 0.01 mol % and at most 0.2 mol %. At below the above range, the properties of the cross-copolymer are inadequate, and at more than the above range, the moldability may be reduced.

The weight-average molecular weight of the olefin-aromatic vinyl compound-aromatic polyene copolymer obtained in the coordination polymerization step should be at most 1,000,000 and at least 30,000, preferably at most 300,000 and at least 30,000 from the standpoint of moldability. The molecular weight distribution (Mw/Mn) of the olefin-aromatic vinyl compound-aromatic polyene copolymer should generally be at least 1.5 and at most 8, preferably at least 1.5 and at most 6, and most preferably at least 1.5 and at most 4. If the molecular weight distribution is greater than this, self-crosslinking may occur in the polyene portion of the olefin-aromatic vinyl compound-aromatic polyene copolymer, thus raising concerns about reduced moldability and gelification.

The weight of the olefin-aromatic vinyl compound-aromatic polyene copolymer obtained in the coordination polymerization step should preferably be at least 50 mass % and at most 95 mass %, more preferably at least 60 mass % and at most 90 mass % of the weight of the cross-copolymer finally obtained by cross-polymerization. Within this range, it is possible to obtain a cross-copolymer excelling in softness, flexibility and elongation. Regarding the proportion (mass %) of the olefin-aromatic vinyl compound-aromatic polyene copolymer obtained in the coordination polymerization step with respect to the weight of the cross-copolymer finally obtained after cross-copolymerization, it can be determined from the generated mass of the main chain polymer determined by sampling and analyzing a portion of the polymer solution after coordination polymerization and the generated mass of the cross-copolymer determined by sampling and analyzing a portion of the polymerization solution after cross-copolymerization. Alternatively, it could be determined by comparing the composition of the main chain olefin-aromatic vinyl compound-aromatic polyene copolymer with the composition of the resulting cross-copolymer.

Regarding the production of the cross-copolymer, examples of aromatic vinyl compound monomers that may be used for the cross-copolymerization step include styrene, p-methylstyrene, p-tertiary-butylstyrene, p-chlorostyrene, α-methylstyrene, vinylnaphthalene and vinylanthracene, among which styrene is preferred. The aromatic vinyl compound monomer used in the coordination polymerization step and the aromatic vinyl compound monomer used in the cross-copolymerization step should preferably be the same. It is most preferable to use styrene as the aromatic vinyl compound monomer in the coordination polymerization step and also styrene as the aromatic vinyl compound monomer in the cross-copolymerization step, of which all or a portion could be styrene that did not react in the coordination polymerization step.

During the cross-copolymerization step, it is possible to add a monomer capable of anionic polymerization or radical polymerization in addition to the aromatic vinyl compound monomer. The added amount should at maximum be the molar equivalent to the amount of the aromatic vinyl compound monomer used.

Aside from the above-mentioned monomer, during the cross-copolymerization step, small quantities of aromatic polyenes which were not polymerized in the coordination polymerization step and remain in the polymer solution may also be polymerized.

While the length (molecular weight) of the cross chain portion can be estimated from the molecular weight of the non-cross-copolymerized homopolymers, the length by weight-average molecular weight should preferably be at least 5000 and at most 150,000, more preferably at least 5000 and at most 100,000, even more preferably at least 5000 and at most 50,000. Additionally, the molecular weight distribution (Mw/Mn) should preferably be at most 5, and more preferably at most 3.

Herebelow, the method for producing the cross-copolymer used in the thermoplastic resin composition of the present invention shall be explained in detail.

<Coordination Polymerization Step>

A single-site coordination polymerization catalyst is used for the coordination polymerization step. Preferably, a combination of a transition metal compound represented by the below-given general formula (1) or (2) and a co-catalyst as described below is used.

<Transition Metal Compound>

[Chem 5]

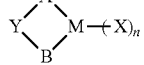

general formula (1)

wherein,

A and B may be identical or different, and are groups chosen from among non-substituted or substituted benzoindenyl groups, non-substituted or substituted indenyl groups, non-substituted or substituted cyclopentadienyl groups and non-substituted or substituted fluorenyl groups;

Y is a methylene group having bonds with A and B, and also having, as substituent groups, a hydrogen or hydrocarbon group (possibly including 1-3 nitrogen, oxygen, sulfur, phosphorus or silicon atoms) having 1-15 carbon atoms, the substituent groups possibly being identical or different, and Y possibly having a cyclic structure;

X is a hydrogen, a hydroxyl group, a halogen, a hydrocarbon group having 1-20 carbon atoms, an alkoxy group having 1-20 carbon atoms, a silyl group having a hydrocarbon substituent group with 1-4 carbon atoms, or an amido group having a hydrocarbon substituent group with 1-20 carbon atoms, and if there are a plurality of X's, the X's may be bonded together;

n is the integer 1 or 2; and

M is zirconium, hafnium or titanium.

[Chem 6]

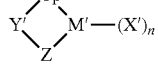

general formula (2)

wherein,

Cp is a group chosen from among non-substituted or substituted cyclopentaphenanthryl groups, non-substituted or substituted benzoindenyl groups, non-substituted or substituted cyclopentadienyl groups, non-substituted or substituted indenyl groups, and non-substituted or substituted fluorenyl groups;

Y' is a methylene group, a silylene group, an ethylene group, a germylene group or a boron residue having bonds with Cp and Z, and also having a hydrogen or a hydrocarbon group with 1-15 carbon atoms, the substituent groups possibly being identical or different, and Y' possibly having a cyclic structure;

Z is a ligand comprising nitrogen, oxygen or sulfur, coordinated with M' via the nitrogen, oxygen or sulfur, having a bond with Y' and also having a hydrogen or a substituent group with 1-15 carbon atoms;

M' is zirconium, hafnium or titanium;

X' is a hydrogen, a halogen, an alkyl group having 1-15 carbon atoms, an aryl group having 6-10 carbon atoms, an alkylaryl group having 8-12 carbon atoms, a silyl group having a hydrocarbon substituent group with 1-4 carbon atoms, an alkoxy group having 1-10 carbon atoms, or a dialkylamido group having an alkyl substituent group with 1-6 carbon atoms; and n is an integer 1 or 2.

Preferred examples of transition metal compounds expressed by general formula (1) include the transition metal compounds having substituted methylene cross-linking structures specifically described in EP 0872492 A2, JP H11-130808 A and JP H9-309925 A. Preferred examples of transition metal compounds expressed by general formula (2) include the transition metal compounds specifically described in EP 416815 A and U.S. Pat. No. 6,323,294 B1.

Furthermore, when the transition metal compound of the single-site coordination polymerization catalyst which is used has the structure expressed by general formula (1), wherein A and B are groups chosen from among non-substituted or substituted benzoindenyl groups and non-substituted or substituted indenyl groups, Y is a methylene group having bonds with A and B, and having a hydrogen or a hydrocarbon group with 1-15 carbon atoms (possibly including 1-3 nitrogen, oxygen, sulfur, phosphorus or silicon atoms) as a substituent group, and the transition metal compound is racemic, the resulting olefin-aromatic vinyl compound-aromatic polyene copolymer in the scope of the present composition will have isotactic three-dimensional regularity in an alternating olefin-aromatic vinyl compound structure, preferably an alternating ethylene-aromatic vinyl compound structure, as a result of which the cross-copolymer will have microcrystallinity originating in this alternating structure. In this case, the olefin-aromatic vinyl compound-aromatic polyene copolymer is capable of providing good mechanical properties and oil resistance based on the microcrystallinity of the alternating structure as compared with the case in which such three-dimensional regularity is lacking, and this characteristic may ultimately be imparted to the cross-copolymer.

Furthermore, it is preferable for A and B in the transition metal compound expressed by general formula (1) to be groups chosen from among non-substituted benzoindenyl groups and non-substituted indenyl groups, since they have extremely high polymerization activity for production of olefin-aromatic vinyl compound-aromatic polyene copolymers.

<Co-Catalyst>

As the co-catalyst, a publicly known co-catalyst such as those used in combination with conventional transition metal compounds may be used, preferred examples of such co-catalysts being alumoxanes such as methylaluminoxane (or methylalumoxane, also referred to as MAO), and boron compounds. Examples of the co-catalysts used are the co-catalysts and alkyl aluminum compounds described in EP 0872492 A2, JP H11-130808 A, JP H9-309925 A, WO 00/20426, EP 0985689 A2 and JP H6-184179 A.

The co-catalyst such as alumoxane should be used at an aluminum atom/transition metal atom ratio of 0.1-100,000, preferably 10-10,000 with respect to the metal in the transition metal compound. If less than 0.1, the transition metal compound cannot be effectively activated, and at more than 100,000, there are economic disadvantages.

When using a boron compound as the co-catalyst, it should be used at a boron atom/transition metal atom ratio of 0.01-100, preferably 0.1-10 and more preferably 1. If less than 0.01, the transition metal compound cannot be effectively activated, and at more than 100, there are economic disadvantages.

The transition metal compound and co-catalyst may be mixed and prepared outside the polymerization plant, or mixed inside the plant during polymerization.

When producing the olefin-aromatic vinyl compound-aromatic polyene copolymer during the coordination polymerization step, the monomer, transition metal compound and co-catalyst described above are brought into contact. The contact sequence and contact method may rely on any publicly known method.

The above-mentioned method of copolymerization may be a method of polymerization in liquid monomer without using a solvent, or a method using a sole or mixed solvent of a saturated aliphatic or aromatic hydrocarbon or halogenated hydrocarbon such as pentane, hexane, heptane, cyclohexane, benzene, toluene, ethylbenzene, xylene, chloro-substituted benzene, chloro-substituted toluene, methylene chloride and chloroform. Preferably, a mixed alkane solvent, cyclohexane, toluene or ethylbenzene is used. The form of polymerization may be solution polymerization or slurry polymerization. Additionally, a publicly known method such as batch polymerization, continuous polymerization, prepolymerization or multi-stage polymerization may be used.

A single or a plurality of connected polymerization tanks or a single or a plurality of connected linear or looped polymerization pipes may also be used. Pipe-shaped polymerization tanks may be equipped with various publicly known types of mixers such as dynamic or static mixers and static mixers also serving as heat dissipators, or various publicly known types of coolers such as coolers equipped with heat-dissipating capillaries. Additionally, batch-type prepolymerization tanks can also be used. Furthermore, vapor phase polymerization can also be used.

The polymerization temperature is preferably −78° C. to 200° C. At less than −78° C., there are industrial disadvantages, and at more than 200° C., decomposition of the transition metal compound can occur. More preferable from an industrial standpoint is a temperature of 0° C. to 160° C., preferable 30° C. to 160° C.

The pressure at the time of polymerization should be 0.1 atm to 100 atm, preferably 1-30 atm, and more preferably from an industrial standpoint, 1-10 atm.

The crystal melting point due to microcrystallinity of the alternating structure of the olefin-aromatic vinyl compound-aromatic polyene copolymer is roughly in the range of 50° C. to 120° C., and the crystal fusion heat by DSC is 1-30 J/g or less, so overall, the cross-copolymer may have a crystal fusion heat of 50 J/g or less, preferably 30 J/g or less. The crystallinity with the crystal fusion heat in the present range does not adversely affect the softness and moldability of the cross-copolymer, and is in fact beneficial for achieving good mechanical properties and oil resistance.

In the olefin-aromatic vinyl compound-aromatic polyene copolymer obtained in the coordination polymerization step, the TUS/DOU value should be higher than 1.1, roughly at least 1.2 and at most 10, preferably at least 1.2 and at most 5. If the TUS/DOU value is higher, the amount of the aromatic polyene units is too small, so the function of the present invention as a cross-copolymer is lost. Additionally, if the TUS/DOU value is 1.1 or less, then the amount of aromatic polyene units is too large, so that the functions due to the main chain are lost, and the moldability of the cross-copolymer is degraded, in which case gel portions may occur in the cross-copolymer. Here, TUS refers to the total vinyl content in the copolymer, which is the sum of the quantity of vinyl groups in the aromatic polyene units and the quantity of vinyl groups in the polymer terminals, determined by $^1$H-NMR measurements. Additionally, the DOU value is the quantity of aromatic polyene units contained in the main chain olefin-aromatic vinyl compound-aromatic polyene copolymer. The significance of TUS-DOU value and methods of determination thereof are disclosed in U.S. Pat. No. 6,414,102, U.S. Pat. No. 6,265,493 and U.S. Pat. No. 696,849.

<Cross-Copolymerization Step>

In the cross-copolymerization step, anionic polymerization or radical polymerization is performed using an anionic polymerization initiator or radical polymerization initiator in the presence of both the olefin-aromatic vinyl compound-aromatic polyene copolymer obtained in the coordination polymerization step and an aromatic vinyl compound monomer.

When employing anionic polymerization in the cross-copolymerization step, it is possible to use a publicly known anionic polymerization initiator. Preferably, an alkyl lithium compound or a lithium salt or sodium salt of biphenyl, naphthalene or pyrene is used, more preferably sec-butyllithium or n(normal)-butyllithium. Additionally, polyfunctional initiators, dilithium compounds and trilithium compounds can also be used. Furthermore, publicly known anionic polymerization-terminating coupling agents may be used as needed.

While the solvent is preferably a mixed alkane solvent, cyclohexane or benzene in which there is no risk of chain transfer, if the polymerization temperature is held to 150° C. or less, other solvents such as toluene and ethylbenzene can also be used.

When employing radical polymerization in the cross-copolymerization step, it is possible to use a publicly known radical polymerization initiator that can be used for polymerization or copolymerization of aromatic vinyl compounds. Those skilled in the art may freely choose peroxide or azo-type polymerization initiators as needed.

Examples thereof are described in catalogs such as the NOF catalog "Organic Peroxides, 10th ed." (http://www.nof.co.jp/business/chemical/pdf/product01/Catalog_all, downloadable in pdf form) and the Wako Pure Chemical Industries catalog.

While the amount of polymerization initiator used is not particularly restricted, 0.001-5 parts by mass should normally be used with respect to 100 parts by mass of the monomer. When using initiators such as peroxide or azo-type polymerization initiators or curing agents, the curing process should be performed at an appropriate temperature and duration in consideration of the half-life. While the conditions in this case will depend on the initiator and curing agent, a temperature range of about 50° C. to 150° C. is generally appropriate. A publicly known chain transfer agent can be used during the radical polymerization step, mainly for the purpose of controlling the molecular weight of the cross-chain. Examples of such chain transfer agents include mercaptan derivatives such as t-dodecylmercaptan and a-styrene dimers.

While the solvent should preferably be an alkane solvent or solvent such as cyclohexane or benzene, it is also possible to use other types of solvents such as toluene and ethylbenzene.

The higher the polymer conversion rate of the aromatic vinyl compound monomers during the cross-copolymerization step, the better the mechanical properties and optical properties of the cross-copolymer. For this reason, it is preferable to use anionic polymerization which is capable of easily achieving a high polymer conversion rate among the aromatic vinyl compound monomers in a relatively short period of time.

The cross-copolymerization step is performed after the above-mentioned coordination polymerization step. At this time, the copolymer obtained in the coordination polymerization step may be separated and purified from the polymer solution using any appropriate polymer recovery method such as crumb forming, steam stripping, or direct solvent removal using a devolatilizing tank or devolatilizing extruder, before being used in the cross-copolymerization step. However, it is preferable to remove the residual olefins from the polymer solution after coordination polymerization by depressurization, or even not to perform depressurization, so as to be used in the cross-copolymerization step for economic reasons. One of the characteristics of the present invention is that the polymer solution including the polymer can be used in the cross-copolymerization step without separating the polymer from the polymer solution.

As the polymerization format, it is possible to use any publicly known method of radical or anionic polymerization. The polymerization temperature is preferably −78° C. to 200° C. A polymerization temperature of less than −78° C. is industrially disadvantageous, and at more than 200° C., chain transfer will occur. More preferable from an industrial standpoint is a temperature of 0° C. to 200° C., and especially preferable is 30° C. to 150° C.

The pressure of polymerization should be 0.1 atm to 100 atm, preferably 1-30 atm, and more preferably from an industrial standpoint, 1-10 atm.

<Polyphenylene Ether Resin>

A polyphenylene ether resin is a resin substantially composed of the polyphenylene ether units indicated by the following general formula (3), also containing up to 80 mass %, preferably up to 50 mass %, of other aromatic vinyl compound polymers with respect to the mass of the resin as needed.

[Chem 7]

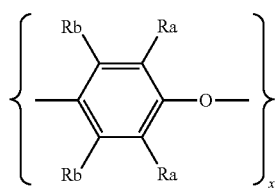

general formula (3)

In the formula, Ra is a group chosen from among alkyl groups and halogenated alkyl groups having 1-4 carbon atoms. Rb is a group chosen from among hydrogen, alkyl groups and halogenated alkyl groups having 1-4 carbon atoms, at least one of them being a hydrogen. X is an integer of 1 or more indicating the number of repeating units. The polyphenylene ether units contained in the resin may be identical or different.

The polyphenylene ether units contained in the resin may be identical or different. Examples of such polyphenylene ether resins include polymers consisting of identical repeating units of poly(2,6-dimethyl-1,4-phenylene) ether, poly(2-methyl-6-n-butyl-1,4-phenylene) ether, poly(2-ethyl-6-n-propyl-1,4-phenylene) ether, poly(2-methyl-6-ethyl-1,4-phenylene) ether, poly(2,6-diethyl-1,4-phenylene) ether, poly(2,6-di-n-propyl-1,4-phenylene) ether, poly(2-methyl-6-chloroethyl-1,4-phenylene) ether, poly(2-ethyl-6-isopropyl-1,4-phenylene) ether and poly(2-methyl-6-chloroethyl-1,4-phenylene) ether, or copolymers of said units. The polyphenylene ether may include a copolymer of 2,6-dimethylphenol with 2,3,6-trimethylphenol, or a copolymer with o-cresole, or a copolymer with 2,3,6-trimethylphenol and o-cresole. Furthermore, various phenylene ether units, for example, phenylene ether units comprising a hydroxy group, an aminomethyl group or an N-phenylaminomethyl group, may be copolymerized as a partial structure thereof up to 20 wt % overall.

While the molecular weight of the polyphenylene ether resin used in the present invention is not particularly limited, it should be 2,000 to 300,000 by standard polystyrene-converted weight-average molecular weight as measured by gel permeation chromatography (GPC), and when considering the moldability, the preferable range is 5,000 to 100,000.

In general, polyphenylene ether resins are often supplied as modified resins containing aromatic vinyl compound polymers. Examples of the aromatic vinyl compound polymer contained in the polyphenylene ether resin include homopolymers or copolymers of aromatic vinyl compounds such as styrenes, α-methylstyrenes and para-methylstyrenes. Examples of aromatic vinyl compounds and copolymerizable monomers include butadienes, isoprenes, other covalent dienes, acrylic acids, methacrylic acids and amide derivatives or ester derivatives thereof, acrylonitrile, maleic anhydride and derivatives thereof. The polystyrene-converted weight-average molecular weight of the aromatic vinyl compound polymer is in the range of 30,000 to 500,000. Additionally, these resins may be so-called high-impact polystyrenes (HIPS) that are reinforced with rubbers such as polybutadiene. The aromatic vinyl compound polymer may be contained in an amount of 80 mass % with respect to the entire mass of the polyphenylene ether resin used.

The polyphenylene ether resins capable of being used in the present invention are offered, for example, from SABIC Innovative Plastics under the product name Noryl, from Asahi Kasei Chemicals under the product name Xylon and from Mitsubishi Engineering Plastics under the product name Iupiace.

The method of producing the thermoplastic resin composition containing a polyphenylene ether resin as the cross-copolymer is not particularly limited, and an appropriate publicly known blending method may be used. For example, melt-mixing may be performed using a uniaxial or biaxial screw extruder, a Banbury mixer, a Plastomill, a co-kneader or a hot roller. The raw materials may be mixed homogeneous before melt-mixing using a Henschel mixer, a ribbon blender, a super mixer or a tumbler. While there are no particular limits on the melt-mixing temperature, it should normally be 130-350° C., preferably 150-300° C.

<Thermoplastic Resin Composition>

One of the characteristics of the thermoplastic resin composition of the present invention is that the cross-copolymer is contained in an amount in the range of 5-99 mass % and the polyphenylene ether resin is contained in the range of 95-1 mass %. In particular, when wishing to obtain a heat-resistant thermoplastic elastomer with an A-hardness of at least 50 and at most 95, the composition should preferably be within the range of 20-99 mass % cross-copolymer and 80-1 mass % polyphenylene ether resin, more preferably 30-95 mass % cross-copolymer and 80-5 mass % polyphenylene ether resin.

Surprisingly, in the present invention, even if the amount of polyphenylene ether resin added is just a few mass % with respect to the mass of the thermoplastic resin composition, the heat resistance is significantly improved. Furthermore, even if the amount of polyphenylene ether resin added is as much as 80 mass %, the A hardness of the thermoplastic resin composition can be held at about 95, enabling the softness (elastomeric property) to be maintained. In tensile tests, this heat-resistance thermoplastic elastomer has a break elongation of at least 50% and less than 1500%, and a break strength of at least 10 MPa and up to 100 MPa. Furthermore, in heat deformation resistance tests, it has a heat deformation resistance temperature of at least 130° C. and preferably a heat deformation resistance temperature of at least 140° C.

Additionally, this heat-resistant thermoplastic elastomer is such that, when having an A hardness of 70 or more, the temperature at which the storage elasticity (E') observed by viscoelastic spectrsoscopy (measurement frequency 1 Hz) falls to $10^6$ Pa is at least 120° C., and when the A hardness is at least 50 and less than 70, the temperature at which the storage elasticity (E') observed by viscoelastic spectroscopy (measurement frequency 1 Hz) falls to $10^5$ Pa is at least 140° C.

Furthermore, this heat-resistant thermoplastic elastomer is such that when measured by viscoelastic spectroscopy (measurement frequency 1 Hz) with a sample measurement length of 10 mm, the temperature at which the residual elongation (δL) of the sample reaches 10% (in other words, the temperature at which the sample measurement length reaches 11 mm) is at least 115° C., thus having high elastic recovery at high temperatures.

Additionally, since the scratch-abrasion resistance of the cross-copolymer is maintained or improved by combining the cross-copolymer with a polyphenylene ether resin, the thermoplastic resin composition also excels in scratch-abrasion resistance.

Additionally, when the amount of the cross-copolymer is in the range of 5-20 mass % and that of the polyphenylene ether resin is in the range of 95-80 mass %, the break elongation in tensile tests will be in the range of at least 5% and less than 50%, resulting in a thermoplastic resin composition excelling in flexibility and elongation relative to the polyphenylene ether resin alone.

The preferred MFR (measured at 260° C. with a load of 10 kg) of the thermoplastic resin composition is at least 0.1 g/10 min and at most 200 g/10 min, more preferably at least 0.3 g/10 min and at most 100 g/10 min. By combining the polyphenylene ether resin and the cross-copolymer, it is possible to obtain a thermoplastic resin composition having excellent MFR (moldability) as compared with the polyphenylene resin alone.

Thermoplastic resin compositions have the property of excelling in slidability. By adding a polyphenylene ether resin to the cross-copolymer, the friction coefficient on the surface can be reduced so as to improve the slidability as compared with cross-copolymers alone. In particular, when the composition is in the range of 5-10 mass % cross-copolymer and 95-80 mass % polyphenylene ether resin, it is suitable for applications requiring slidability such as bearings, slide contacts and gears.

<Optional Additional Components>

The thermoplastic resin composition may also include additives used in normal resins, such as plasticizers, thermal stabilizers, anti-oxidants, anti-static agents, anti-weather agents, photoprotective agents, UV absorbers, anti-ageing agents, fillers, colorants, lubricants, defogging agents, foaming agents, flame retardants and flame retardant assistants.

<Plasticizers>

The thermoplastic resin composition may contain any publicly known plasticizer that is conventionally used in vinyl chlorides and other resins. The plasticizer should be a hydrocarbon plasticizer, or an oxygen-containing or nitrogen-containing plasticizer. Examples of hydrocarbon plasticizers include aliphatic hydrocarbon plasticizers, aromatic hydrocarbon plasticizers and naphthene plasticizers, and examples of oxygen-containing or nitrogen-containing plasticizers such as ester plasticizers, epoxy plasticizers, ether plasticizers and amide plasticizers.

These plasticizers can be used to adjust the hardness or fluidity (moldability) of the thermoplastic resin composition. Additionally, they have the effect of lowering the glass transition temperature and the embrittlement temperature.

Examples of ester plasticizers include mono fatty acid esters such as phthalic acid esters, trimellitic acid esters, adipic acid esters, sebacic acid esters, azelate esters, citric acid esters, acetylcitric acid esters, glutamic acid esters, succinic acid esters and acetic acid esters, phosphoric acid esters and polyesters thereof.

Examples of epoxy plasticizers include epoxylated soybean oil and epoxylated linseed oil.

Examples of ether plasticizers include polyethylene glycol, polypropylene glycol, and copolymers and mixtures thereof.

Examples of amide plasticizers include amide sulfonates. These plasticizers may be used singly or plurally.

Especially preferable for use in the present invention are ester plasticizers. These plasticizers excel in compatibility with aromatic vinyl compound-olefin-aromatic polyene copolymers, and have the advantage of excelling in plasticizing effects (high level of reduction in glass transition temperature) and little bleeding.

The amount of the plasticizer should be at least 1 part by mass and at most 25 parts by mass of the plasticizer, preferably at least 1 part by mass and at most 15 parts by mass, with respect to 100 parts by mass of the thermoplastic resin composition or its resin composition. At less than 1 part by mass, the above-described effects are inadequate, and at more than 25 parts by mass, it may cause bleeding, excessive softness, or excessive stickiness resulting therefrom.

<Inorganic Filler>

Inorganic fillers are used for providing the thermoplastic resin composition with flame retardance. The volumetric average particle size of the inorganic filler is preferably at most 50 μm, more preferably at most 10 μm. When the volumetric average particle size is less than 0.5 μm or in excess of 50 μm, the mechanical properties (tensile strength, break elongation, etc.) when forming a film will be reduced, causing decreases in softness and forming pinholes. The volumetric average particle size is the volumetric average particle size as measured by laser diffraction.

Examples of inorganic fillers include aluminum hydroxide, magnesium hydroxide, zirconium hydroxide, calcium hydroxide, potassium hydroxide, barium hydroxide, tolyphenyl phosphate, ammonium polyphosphate, amide polyphosphate, zirconium oxide, magnesium oxide, zinc oxide, titanium oxide, molybdenum oxide, guanidine phosphate, hydrotalcite, smectite, zinc borate, anhydrous zinc borate, zinc metaborate, barium metaborate, antimony oxide, antimony trioxide, antimony pentoxide, red phosphorus, talc, alumina, silica, boehmite, bentonite, sodium silicate, calcium silicate, calcium sulfate, calcium carbonate and magnesium carbonate, one or more compounds chosen from the above being capable of being used. In particular, using at least one type chosen from the group consisting of aluminum hydroxide, magnesium hydroxide, hydrotalcite and magnesium carbonate provides excellent flame retardance and is economically advantageous.

The amount of the inorganic filler should be in the range of 1-500 parts by mass, preferably 5-200 parts by mass with respect to 100 parts by mass of the thermoplastic resin composition. If the amount of the inorganic filler is less than 1 part by mass, the flame retardance may suffer. On the other hand, if the amount of the inorganic filler exceeds 500 parts by mass, the mechanical properties such as moldability and strength of the resin composition may be reduced.

When adding an inorganic filler as a non-halogen flame retardant, it is possible to ensure formation of char (carbonation layer) in order to improve the flame retardance of the film.

<Flame Retardant>

Examples of organic flame retardants include bromine compounds such as pentabromodiphenyl ether, octabromodiphenyl ether, decabromodiphenyl ether, tetrabromo bisphenol A and hexabromocyclododecane, phosphorus compounds including aromatic phosphoric acid esters such as triphenylphosphate, red phosphorus and phosphoric acid esters containing halogens, nitrogen compounds such as 1,3,5-triazine derivatives, and halogen-containing compounds such as chlorinated paraffins and brominated paraffins.

Examples of inorganic flame retardants include antimony compounds which are also inorganic fillers as indicated above, and metal hydroxides such as aluminum hydroxide and magnesium hydroxide. These flame retardants may be used in appropriate amounts depending on the application. They may be used together with appropriate publicly known frame retardant assistants as well. Examples of flame retardants are described in JP H11-199724 A and JP 2002-533478 T.

<Photoprotective Agents>

The photoprotective agent used in the present invention is a publicly known photoprotective agent. Generally, photoprotective agents are composed of a UV absorber for converting photonic energy into harmless thermal energy and a hindered amine type photostabilizer for capturing radicals generated by photo-oxidation. The mass ratio of the UV absorber to the hindered amine photostabilizer is within the range of 1:100 to 100:1, the sum of the masses of the UV absorber and the hindered amine photostabilizer being the mass of the photoprotective agent, which is used within the range of 0.05-5 parts by mass with respect to 100 parts by mass of the thermoplastic resin composition.

<Resin Composition>

The thermoplastic resin composition can further be used as a resin composition together with the olefin polymers indicated below. In this case, the thermoplastic resin composition may be used in a range of 50-99 mass % with respect to the total mass of the resin composition. In order for the thermoplastic resin composition to exhibit good compatibility with the olefin polymer, the resulting resin composition should be relatively soft, and have improved heat resistance, solvent resistance and flame retardance compared with polyolefins.

The "olefin polymer" that can be used is an olefin homopolymer or copolymer consisting of olefin monomers with 2-20 carbon atoms, for example, high-density polyethylene (LDPE), low-density polyethylene (LDPE), linear low-density polyethylene (LLDPE), polyolefin elastomer (POE), isotactic polypropylene (including i-PP, homoPP, random PP and block PP), syndiotactic polypropylene (s-PP), atactic polypropylene (a-PP), propylene-ethylene block copolymers, propylene-ethylene random copolymers, propylene-butene copolymers, ethylene-norbornene copolymers, ethylene-vinylcyclohexane copolymers, ethylene-vinyl acetate copolymers (EVA), ethylene-methacrylic acid ester copolymers, ethylene-acrylic acid ester copolymers and ethylene-acrylic acid copolymers. If needed, the copolymers may be copolymerized with dienes such as butadiene or α-ω dienes. Examples include ethylene-propylene-diene copolymer (EPDM) and ethylene-propylene-ethylidene norbornene copolymer. The above-mentioned olefin polymers should have a polystyrene-converted weight-average molecular weight of at least 10,000, preferably at least 30,000 and at most 500,000, and preferably at most 300,000, in order to achieve the physical properties and moldability as an application resin.

Furthermore, the thermoplastic resin composition can be used as a composition together with a block copolymer type polymer, used in the range of 1-99 mass % with respect to the total mass of the composition. Since the cross-copolymer contained in the thermoplastic resin composition has good softness and oil resistance, the composition together with the block copolymer type polymer can be provided with oil resistance without sacrificing the softness and mechanical properties of the block copolymer.

The "block copolymer type polymer" that can be used is a block copolymer having a diblock, triblock, multiblock, star block or tapered block structure, which can be obtained by living polymerization through anionic polymerization or another polymerization method. Examples thereof include styrene-butadiene block copolymer (SBS), styrene-isoprene copolymer (SIS) and hydrogenates thereof (SEBS or SIPS). The above-mentioned block copolymer type polymer should have a polystyrene-converted weight-average molecular weight of at least 5000, preferably at least 10,000 and at most 500,000, and preferably at most 300,000 in order to achieve the physical properties and moldability as an application resin.

Furthermore, the thermoplastic resin composition may be used as a composition together with a "petroleum resin or a hydrogenated petroleum resin", and the amount added should generally be 1-40 parts by mass, preferably 1-20 parts by mass with respect to 100 parts by mass of the thermoplastic resin composition. By adding a "petroleum resin or a hydrogenated petroleum resin", it is possible to retain the various physical properties and functionalities while improving the fluidity so as to adapt it to various molding methods.

Furthermore, the thermoplastic resin composition may be used as a composition together with a "polyamide resin" and/or a "polyester resin", and these resins may be added in the range of 1-100 parts by mass with respect to 100 parts by mass of the thermoplastic resin composition. Such resin compositions can provide excellent high-temperature oil resistance and a balance between rigidity and toughness in addition to the heat resistance, softness and mechanical properties of the present resin composition. An example of a "polyamide resin" that may be used is the polyamide described in JP H8-217972 A, and an example of a "polyester resin" that may be used is the polyester described in JP H5-186680 A.

The method of producing the resin composition is not particularly limited, and any appropriate publicly known blending method can be used. For example, melt-mixing may be performed using a uniaxial or biaxial screw extruder, a Banbury mixer, a Plastomill, a co-kneader or a hot roller. The raw materials may be mixed homogeneous before melt-mixing using a Henschel mixer, a ribbon blender, a super mixer or a tumbler. While there are no particular limits on the melt-mixing temperature, it should normally be 150-300° C., preferably 200-250° C.

The method of molding the various compositions may be any publicly known molding method such as vacuum forming, injection molding, blow molding, extrusion molding or profile extrusion molding.

<Film, Tape Substrate>

When the thermoplastic resin composition or a resin composition containing it is formed into a film (sheet), there are no particular limits on the thickness, but it should generally be 3 μm to 1 mm, preferably 10 μm to 0.5 mm.

In order to produce a film, a forming method such as inflation forming, T-die forming, calender forming or roll forming may be used. The film may be laminated with other appropriate films, for example isotactic or syndiotactic polypropylene, high-density polyethylene, low-density polyethylene (LDPE or LLDPE), polystyrene, polyethylene terephthalate or ethylene-vinyl acetate copolymer (EVA) for the purpose of improving the physical properties.

The specific application of the thermoplastic resin composition or film thereof is not particularly limited, but it is useful as various types of covering materials due to its excellent mechanical properties, texture, oil resistance, scratch-abrasion resistance and heat resistance.

As a material for automobile interiors, it can be used, for example, on the instrument panel, door trim, seat covering, ceiling material, floor covering, and as the covering for the steering wheel, brake, levers and grips. It is also suitable for use as a floor mat material. In the case of these applications, it may be laminated together with polyolefin or polyurethane foam sheets, or may itself be foamed for use. Its surface may also be coated with various types of coatings as needed. Additionally, by performing multilayer injection molding (two-color molding) of the thermoplastic resin composition together with a substrate, a multilayer molded article consisting of a substrate and a covering material can be obtained. Additionally, the covering layer may be foamed by adding a foaming agent to the thermoplastic resin composition and performing core-back injection molding.

Additionally, the film can be used as various types of tape substrates. When used as a tape substrate, the softness, heat resistance, oil resistance and characteristic tensile properties and flame retardance of the thermoplastic resin offer merits. The tape substrate can be formed using publicly known adhesives, additives or forming methods. Such adhesives, additives and forming methods are described, for example, in JP 2000-111646 A. The adhesive tape consisting of this tape substrate is suitable for use as various types of connective tape, protective tape or fixture tape.

The film may be subjected to a surface treatment such as a corona treatment, ozone treatment or plasma treatment, or coated with defogging agent, coated with lubricant or printed as needed. The film may be produced as a stretched film that has been subjected to uniaxial or biaxial stretch orientation as needed. The film may be fused with another of the same film or with a material such as another thermoplastic resin by fusion using heat, ultrasonic waves or RF radiation, or adhesion using solvents or the like.

Additionally, when the film has a thickness, for example, of at least 100 μm, it can be used to form trays for packaging food products or electrical appliances using a technique such as vacuum forming, compression molding or compressed-air forming.

Furthermore, the thermoplastic resin composition can be favorably used as various types of wire coverings (jacket) or cable coverings. In that case, the softness, heat resistance, oil resistance, scratch-abrasion resistance and flame retardance of the thermoplastic resin composition offer merits. Additionally, the thermoplastic resin composition has a low dielectric constant and low dielectric loss, and can therefore be used as various types of wire covering or cable covering for high frequency insulating, or as an insulation material for high frequency. For the purposes of this application, the dielectric constant of the thermoplastic resin composition of the present invention at 1 GHz should preferably be at least 2.0 and at most 2.8, and the dielectric loss (tan δ) should preferably be at least 0.0005 and at most 0.005.

Of the thermoplastic resin compositions described above, the heat-resistant thermoplastic elastomers with an A hardness in the range of 50-95 are characterized by simultaneously having softness, high heat resistance and moldability, even without having performed a crosslinking treatment or dynamic vulcanization treatment. However, the thermoplastic resin composition can be subjected to publicly known crosslinking methods or dynamic vulcanization treatments for the purpose of improving the heat resistance and raising the oil resistance. For example, crosslinking methods are described in JP H10-505621 T, and dynamic vulcanization methods are described in JP H11-293045 A and JP H11-293046 A.

Furthermore, the resin composition may be foamed by a publicly known method. The foam may be an open-cell foam or a closed-cell foam, and publicly known production methods such as extrusion foaming and bead foaming may be used. The method of forming a foam may be a method such as those described in JP 00/037517 A1, JP 2001-514275 T and JP 2002-506903 T. Such foams are useful as the filler in automobile bumpers, as structural materials for automobiles, and in various types of gaskets.

Since the resin composition of the present invention basically contains no halogens, it has the basic characteristic of being environmentally friendly and very safe.

EXAMPLES

Herebelow, the present invention shall be described with reference to examples, but the present invention should not be construed as being limited by these examples.

Copolymers obtained in the examples were analyzed by the means indicated below.

The $^{13}$C-NMR spectrum was measured by a JEOL α-500, using a heavy chloroform solvent or heavy 1,1,2,2-tetrachloroethane solvent, with TMS as the reference. Measurements using TMS as the reference mentioned here are measured as described below. First, the shift of the central peak among the triplet $^{13}$C-NMR peaks of heavy 1,1,2,2-tetrachloroethane is determined using TMS as the reference. Next, the copolymer is dissolved in heavy 1,1,2,2-tetrachloroethane, and measured by $^{13}$C-NMR, then each peak shift is computed using the triplet center peak of heavy 1,1,2,2-tetrachloroethane as the reference. The shift of the triplet center peak of heavy 1,1,2,2-tetrachloroethane was 73.89 ppm. Measurements were made after dissolving 3 mass/volume % of the polymer with respect to the solvents.

$^{13}$C-NMR spectrum measurements quantifying the peak areas were performed by a proton gate decoupling method after eliminating NOE, using a pulse of pulse width 45° and repetition period of 5 seconds.

The styrene content in the copolymer was determined by $^1$H-NMR, using a JEOL α-500. After dissolving the copolymer in heavy 1,1,2,2-tetrachloroethane, the measurements were made at 80-100° C. Area intensity comparisons were made between the proton peak from the phenyl groups (6.5-7.5 ppm) and the proton peak from the alkyl groups (0.8-3 ppm), using TMS as the reference.

The molecular weight was determined using GPC (gel permeation chromatography), in the form of the weight-average molecular weight (Mw) and the number-average molecular weight (Mn) converted for standard polystyrene. The measurements were performed under the following conditions:
Column: TSK-GEL Multipore HXL-M φ7.8×300 mm (Tosoh), two connected linearly
Column Temperature: 40° C.
Solvent: THF
Delivered Fluid Flow Rate: 1.0 ml/min The DSC measurements were performed in a nitrogen gas flow using a Seiko Instruments EXSTAR6000. That is, 10 mg of the resin composition were used and DSC measurements were made from −50° C. to 240° C. at a temperature increase rate of 10° C./min, to determine the melting point, crystal fusion heat and glass transition point. A second measurement was not performed after rapidly cooling with liquid nitrogen following the first measurement.

<Sample Sheet Preparation>

As the samples for evaluating the physical properties, a 1.0 mm thick sheet formed by a hot press treatment (temperature 250° C., time 5 minutes, pressure 50 kg/cm$^2$) was used. The sample used for measuring the viscoelastic spectrum was obtained by cutting a 0.5 mm thick sheet obtained under the same conditions.

<Tensile Tests>

The sheets were cut into the shapes of No. 2 and No. 1/2 test pieces in compliance with JIS K-6251, then measured at a tension rate of 500 mm/min using an Orientech Tensilon UCT-1T type tensile tester.

<A Hardness>

1 mm thick sheets were stacked and their type A durometer hardness was determined in accordance with the durometer hardness testing method for plastics under JIS K-7215. The hardness was the instantaneous value.

<Viscoelastic Spectrum>

A measurement sample (3 mm×40 mm) was cut from an approximately 0.5 mm thick film obtained by the above-described hot press method, and measured at a frequency of 1 Hz in a temperature range of −50° C. to +250° C. using a dynamic viscoelasticity measuring apparatus (Rheometrics RSA-III).

The measurement parameters for measuring residual elongation (δL) of the sample are as described below.
Measurement Frequency: 1 Hz
Temperature Increase Rate: 4° C./min
Sample Measurement Length: 10 mm
Initial Static Force: 5.0 g
Auto Tension Sensitivity: 1.0 g
Max Auto Tension Rate: 0.033 mm/s
Max Applied Strain: 1.5%
Min Allowed Force: 1.0 g <Taber Abrasion Tester H-22 Wear Disc>

A Toyoseiki Taber abrasion tester was used to perform Taber abrasion tests under the below-given testing conditions in compliance with JIS K 7204, to measure the amount of abrasion.
Wear Disc: 1'-22
Disc Rotation Speed: 1 rpm Load: 1 kg (rotation number 1000 rotations: JIS)
Test Piece: 2 mm thick square testing piece approximately 100 mm on a side, obtained by press-forming at 200° C. and 50 atm.

<Heat Deformation Resistance Test>

A small JIS No. 2½ dumbbell was hung in a predetermined oven and subjected to a heat treatment for 1 hour at a predetermined temperature. The length was measured prior to the treatment and in the longitudinal and width directions of the dumbbell, and the elongation/contraction deformation rates were determined by the below-given formulas. The highest temperature at which the elongation/contraction deformation rate was within 5% in both the longitudinal and width directions was determined as the heat deformation resistance temperature.

Elongation Deformation Rate=

100×(Length after test−Length before test)/Length before test

Contraction Deformation Rate=

100×(Length before test−Length after test)/Length before test

<Divinylbenzene>

The divinylbenzene was Nippon Steel Chemical 810 (81% pure divinylbenzene, mixture of meta- and para-, meta-:para- mass ratio 70:30).

<Catalyst>

In the below-described Examples 1-11, rac-dimethylmethylene bis-(4,5-benzo-1-indenyl) zirconium dichloride having the below-indicated chemical structure was used as a transition metal compound, and methylalumoxane (MAO) was used as a co-catalyst.

[Chem 8]

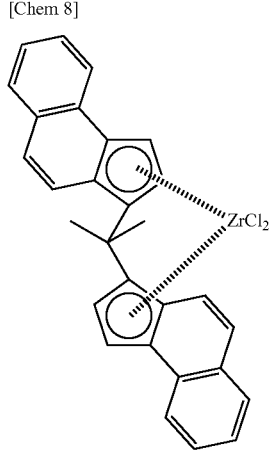

Production Example 1

Production of Cross-Copolymer

Polymerization was performed using an autoclave with agitator and heating/cooling jacket having a capacity of 50 L. 20.8 kg of cyclohexane, 2.8 kg of styrene and divinylbenzene (meta- and para-mixture, purity 81 mass %, 53.3 mmol for divinylbenzene portion) from Nippon Steel Chemical were loaded, the internal temperature was adjusted to 60° C. and agitation was performed (220 rpm). Dry nitrogen gas was bubbled through the solution for about 30 minutes at a flow rate of 10 L/min, and the water content in the polymer solution was purged. Next, 50 mmol of triisobutyl aluminum and 60 mmol of methylalumoxane (Toso Fine Chmicals, MMAO-3A/hexane solution) by Al standard were added, and the system was immediately purged with ethylene. After purging thoroughly, the internal temperature was raised to 70° C. and ethylene was delivered, and after the pressure stabilized at 0.42 MPa (3.2 kg/cm$^2$G), about 50 ml of a toluene solution dissolving 100 μmol of rac-dimethylmethylene bis(4,5-benzo-1-indenyl) zirconium dichloride and 1 mmol of tri- isobutyl aluminum were added from a catalysis tank installed above the autoclave. Furthermore, ethylene was supplied via a flow rate control valve, and the polymerization was performed for 105 minutes while maintaining an internal temperature of 75° C. and a pressure of 0.42 MPa. The progress in the polymerization was monitored by the flow speed and integral flow of the ethylene. The delivery of ethylene was stopped, the ethylene pressure allowed to dissipate and the internal temperature was cooled to 60° C. (this completes the coordinating polymerization step). 220 mmol of n-butyl lithium were delivered from a catalysis tank to a polymerization tank together with nitrogen gas. Anionic polymerization began immediately, and the internal temperature rose from 60° C. to 80° C. at one point. The temperature was maintained at 60-70° C. for 30 minutes under continuous agitation to continue the polymerization. Approximately 100 ml of methanol were added to the polymerization tank, whereupon the anionic polymerization stopped (this completes the cross-copolymerization step).

The resulting polymer solution was loaded a little at a time into vigorously agitated hot water containing a dispersant (Pluronic) and potassium alum. The solvent was removed, resulting in polymer crumbs (about 1 cm in size) dispersed in hot water. These polymer crumbs were relieved of water by centrifuge, air-dried at room temperature for one day and night, then dried in a vacuum at 60° C. until no further changes in mass occurred. This resulted in recovery of about 4.5 kg of polymer.

Production Examples 2-6

Polymerization was performed in a manner similar to Production Example 1, using the recipes and polymerization conditions shown in Table 1.

Table 1 shows the polymerization conditions, and Tables 2-3 show the compositional analysis values for the cross-copolymer.

The analysis values for the polymer obtained in the coordination polymerization step (polymer yield, composition, molecular weight etc. in the coordination polymerization step) were determined by sampling a small amount (a few tens of ml) of the polymer solution after completion of the coordination polymerization step and precipitating the polymer for recovery and analysis. The divinylbenzene unit content of the polymer obtained in the coordination polymerization step was determined from the difference between the amount of unreacted divinylbenzene in the polymer solution determined by gas chromatography analysis and the amount of divinylbenzene used for polymerization.

Additionally, the proportion (mass %) of the copolymer obtained by the coordination polymerization step in the table with respect to the cross-copolymer was determined from the composition (styrene content and ethylene content) of the ethylene-styrene-divinylbenzene copolymer obtained in the coordination polymerization step and the composition (styrene content and ethylene content) of the cross-copolymer obtained through the anionic polymerization step, on the assumption that the change in the composition is due to the mass of the cross-chain polystyrene added by anionic polymerization. Additionally, as an alternative method, the proportion was also determined by comparing the main-chain polymer generation mass determined by sampling and analyzing a portion of the polymer solution after coordination polymerization, and the cross-copolymer generation mass determined by sampling and analyzing a portion of the polymer solution after anionic polymerization. There was substantial agreement between the two values.

Furthermore, the table shows the TUS/DOU value, in accordance with U.S. Pat. No. 6,096,849, of the main-chain ethylene-styrene-divinylbenzene copolymer obtained in the coordination polymerization step of the present example. Here, TUS represents the total vinyl content of the copolymer, which is the sum of the quantity of vinyl groups derived from the aromatic polyene (divinylbenzene) units and the quantity of vinyl groups at the polymer terminals, determined by $^1$H-NMR measurements. Additionally, the DOU value is the divinylbenzene unit content of the main-chain ethylene-styrene-divinylbenzene copolymer.

If the TUS/DOU value is large, the aromatic polyene unit content can be too low, and the cross-copolymer function may be lost, while on the other hand, if the TUS/DOU value is small, the aromatic polyene unit content can be too high, and the functions originating in the main-chain can be lost, the moldability of the cross-copolymer can be reduced, and a gel part may be generated in the cross-copolymer. Therefore, the olefin-aromatic vinyl compound-aromatic polyene copolymer (ethylene-styrene-divinylbenzene copolymer) obtained in the coordination polymerization step should have a TUS/DOU value higher than 1.1, roughly at least 1.2 and at most 10, particularly at least 1.2 and at most 5.

TABLE 1

| | Coordination Polymerization | | | | | | | | | Anionic Polymerization | |
|---|---|---|---|---|---|---|---|---|---|---|---|
| | Catalyst μmol | MAO mmol | Styrene kg | Solvent[1] kg | Temp °C. | Ethylene MPa | DVB[2] mmol | Ethylene Used L | Yield kg | n-BuLi mmol | Yield kg |
| Production Example 1 | 100 | 60 | 2.8 | 20.8 | 75 | 0.42 | 53.3 | approx. 1400 | 3.8 | 220 | 4.5 |
| Production Example 2 | 80 | 60 | 1.7 | 21.8 | 95 | 0.57 | 64.2 | approx. 2200 | 3.9 | 170 | 4.5 |
| Production Example 3 | 80 | 100 | 2.8 | 20.8 | 85 | 0.33 | 76 | approx. 650 | 2.2 | 280 | 3.6 |
| Production Example 4 | 100 | 100 | 3.2 | 20.5 | 90 | 0.4 | 85 | approx. 1200 | 3.5 | 260 | 4.7 |
| Production Example 5 | 100 | 100 | 2.3 | 21.3 | 85 | 0.51 | 87 | approx. 1500 | 3.3 | 260 | 4.2 |
| Production Example 6 | 100 | 100 | 2.4 | 21.2 | 80 | 0.49 | 34 | approx. 1700 | 3.7 | 250 | 4.5 |

[1] Cyclohexane
[2] DVB (divinylbenzene)

TABLE 2

| | Styrene Content mol % | DVB Content mol % | Mw 10$^4$ | Mw/Mn | Tm °C. | ΔH J/g | Tg | TUS/DOU |
|---|---|---|---|---|---|---|---|---|
| Production Example 1 | 23 | 0.05 | 23.7 | 2.7 | —[3] | —[3] | −24 | 1.4 |
| Production Example 2 | 8 | 0.04 | 11.0 | 3.1 | 88 | 41 | −17 | 1.9 |
| Production Example 3 | 30 | 0.10 | 11.8 | 2.6 | —[3] | —[3] | −7 | 1.3 |
| Production Example 4 | 25 | 0.08 | 11.8 | 2.4 | —[3] | —[3] | −12 | 1.6 |
| Production Example 5 | 15 | 0.07 | 8.4 | 2.1 | 61 | 25 | −22 | 1.6 |
| Production Example 6 | 16 | 0.03 | 12.2 | 2.7 | 58 | 18 | −20 | 2.5 |

[3] No fusion peaks were observed for a crystal fusion heat of 10 J/g or more.

TABLE 3

| | Anionic Polymerization | | | | | |
|---|---|---|---|---|---|---|
| | Total Styrene Content mol % | Tm °C. | ΔH J/g | PS Chain Wt Avg Mol Wt Mw | PS Chain Mol Wt Distribution Mw/Mn | Proportion of Copolymer from Coordination Polymerization mass % |
| Production Example 1 | 29 | —[4] | —[4] | 19000 | 1.2 | 84 |
| Production Example 2 | 13 | 90 | 34 | 24000 | 1.7 | 89 |
| Production Example 3 | 47 | —[4] | —[4] | 31000 | 1.4 | 61 |

TABLE 3-continued

| | Anionic Polymerization | | | | | Proportion of Copolymer from Coordination Polymerization mass % |
|---|---|---|---|---|---|---|
| | Total Styrene Content mol % | Tm °C. | ΔH J/g | PS Chain Wt Avg Mol Wt Mw | PS Chain Mol Wt Distribution Mw/Mn | |
| Production Example 4 | 35 | —[4] | —[4] | 30000 | 1.4 | 74 |
| Production Example 5 | 23 | 60 | 10 | 30000 | 1.4 | 79 |
| Production Example 6 | 22 | 60 | 18 | 22000 | 1.3 | 83 |

[4]No fusion peaks were observed for a crystal fusion heat of 10 J/g or more.

Examples 1-14

A thermoplastic resin composition was obtained in the following manner.

Using a Brabender Plasticorder (Brabender PL2000), 45 g of the cross-copolymers and polyphenylene ethers (Mitsubishi Engineering Plastics YPX-100L) obtained in the present production examples were kneaded in the proportions shown in Table 4 (parts by mass), at 250° C. and 100 rpm for 10 minutes to produce samples. The polyphenylene ether (Mitsubishi Engineering Plastics YPX-100L) used was substantially composed of a poly(2,6-dimethyl-1,4-phenylene) ether, the glass transition temperature by DSC measurement was 213° C., the polystyrene-converted weight-average molecular weight (Mw) by GPC was 17000 and the molecular weight distribution (Mw/Mn) was 1.4. Additionally, aromatic vinyl compound polymer (such as polystyrene) components were substantially not included. Irganox 1076 was used as the anti-oxidant. In Example 11, a paraffin processing oil PW-90 was also added as a plasticizer.

A sheet of thickness 1.0 mm formed from the resulting composition by the above-described hot press method was used to perform tensile tests and heat deformation resistance tests.

TABLE 4

| | | Ex. 1 | Ex. 2 | Ex. 3 | Ex. 4 | Ex. 5 | Ex. 6 | Ex. 7 |
|---|---|---|---|---|---|---|---|---|
| Blend (parts by mass) | Polymer of Production Example 1 | 95 | 90 | 80 | 70 | 50 | 30 | 20 |
| | Polymer of Production Example 2 | 0 | 0 | 0 | 0 | 0 | 0 | 0 |
| | Polymer of Production Example 3 | 0 | 0 | 0 | 0 | 0 | 0 | 0 |
| | Polymer of Production Example 4 | 0 | 0 | 0 | 0 | 0 | 0 | 0 |
| | Polymer of Production Example 5 | 0 | 0 | 0 | 0 | 0 | 0 | 0 |
| | Polymer of Production Example 6 | 0 | 0 | 0 | 0 | 0 | 0 | 0 |
| | Styrene-Ethylene Copolymer | 0 | 0 | 0 | 0 | 0 | 0 | 0 |
| | Polyphenylene Ether YPX-100L | 5 | 10 | 20 | 30 | 50 | 70 | 80 |
| | Antioxidant Irg1076 | 0.1 | 0.1 | 0.1 | 0.1 | 0.1 | 0.1 | 0.1 |
| | Plasticizer: Paraffin Processing Oil PW-90 | 0 | 0 | 0 | 0 | 0 | 0 | 0 |
| Physical Property Test Results | MFR 260° C. Load 10 kg g/10 min | 46 | 25 | 19 | 14 | 5.1 | 1.3 | 0.9 |
| | A Hardness | 65 | 68 | 76 | 82 | 89 | 91 | 94 |
| | Initial Tensile Elastic Modulus (MPa) | 5.2 | 7.1 | 11 | 16 | 86 | 443 | 920 |
| | Break Elongation (%) | 840 | 617 | 447 | 310 | 163 | 74 | 60 |
| | Break Strength (MPa) | 18.7 | 19 | 21 | 23 | 29 | 39 | 35 |
| | Heat Deformation Resistance Heat Deformation Temp | 160 | >180 | >180 | >180 | >180 | >180 | >180 |
| | Temp where Storage Elastic Modulus falls to $10^6$ Pa | 107 | 118 | 158 | 175 | 210 | 236 | 247 |
| | Temp where Storage Elastic Modulus falls to $10^5$ Pa | 159 | 178 | — | — | — | — | — |
| | Temp where Residual Elongation (δL) of Sample is 10% | 115 | 126 | 158 | 165 | 184 | 210 | 230 |
| | Taber Abrasion Mass/mg H-22 Wear Disc | 85 | 70 | 59 | 87 | not meas. | not meas. | not meas. |

| | | Ex. 8 | Ex. 9 | Ex. 10 | Ex. 11 | Ex. 12 | Ex. 13 | Ex. 14 |
|---|---|---|---|---|---|---|---|---|
| Blend (parts by mass) | Polymer of Production Example 1 | 10 | 0 | 0 | 80 | 0 | 0 | 0 |
| | Polymer of Production Example 2 | 0 | 80 | 0 | 0 | 0 | 0 | 0 |
| | Polymer of Production Example 3 | 0 | 0 | 80 | 0 | 0 | 0 | 0 |
| | Polymer of Production Example 4 | 0 | 0 | 0 | 0 | 80 | 0 | 0 |
| | Polymer of Production Example 5 | 0 | 0 | 0 | 0 | 0 | 80 | 0 |
| | Polymer of Production Example 6 | 0 | 0 | 0 | 0 | 0 | 0 | 50 |
| | Styrene-Ethylene Copolymer | 0 | 0 | 0 | 0 | 0 | 0 | 0 |
| | Polyphenylene Ether YPX-100L | 90 | 20 | 20 | 20 | 20 | 20 | 50 |
| | Antioxidant Irg1076 | 0.1 | 0.1 | 0.1 | 0.1 | 0.1 | 0.1 | 0.1 |
| | Plasticizer Paraffin Processing Oil PW-90 | 0 | 0 | 0 | 12.5 | 0 | 0 | 0 |
| Physical Property Test Results | MFR 260° C. Load 10 kg g/10 min | 0.5 | 7.5 | 31 | >50 | 47 | 4.8 | 5.4 |
| | A Hardness | 98 | 88 | 88 | 65 | 88 | 89 | 91 |
| | Initial Tensile Elastic Modulus (MPa) | >1000 | 67 | 70 | 5.5 | 30 | 29 | 61 |
| | Break Elongation (%) | 24 | 780 | 310 | 710 | 360 | 370 | 190 |
| | Break Strength (MPa) | 41 | 39 | 23 | 14 | 21 | 24 | 31 |
| | Heat Deformation Resistance Heat Deformation Temp | >180 | >180 | >180 | 160 | >180 | >180 | >180 |

| | | | | | | | |
|---|---|---|---|---|---|---|---|
| Temp where Storage Elastic Modulus falls to $10^6$ Pa | 260 | 165 | 168 | 88 | 149 | 153 | 198 |
| Temp where Storage Elastic Modulus falls to $10^5$ Pa | — | — | — | 159 | — | — | — |
| Temp where Residual Elongation (δL) of Sample is 10% | 257 | 160 | 140 | 118 | 151 | 202 | 190 |
| Taber Abrasion Mass/mg H-22 Wear Disc | not meas. | 75 | 95 | 63 | 80 | 50 | not meas. |

Comparative Examples 1-4

The evaluation results for samples adding only an antioxidant to the polymers obtained in Production Examples 1-3 and kneaded under the same conditions as the Examples are shown in Table 5. Furthermore, polyphenylene ether YPX-100L was kneaded in a similar fashion, and its evaluation results are also shown in Table 5.

Comparative Example 5

A styrene-ethylene copolymer produced by the production method described in JP-A H11-130808 (styrene content 25 mol %, weight average molecular weight 197,000, molecular weight distribution 2.2) was used and kneaded together with the polyphenylene ether YPX-100L using the blending ratios of Table 5.

Comparative Examples

Similar evaluation tests were performed on commercially available TPV1 (polypropylene-EPDM, A hardness approximately 70), TPV2 (hydrogenated styrene-isoprene block copolymer compound, A hardness approximately 80) and TPV3 (polypropylene, fully crosslinked EPR, A hardness approximately 70), and the results are shown in Table 5.

resin exhibits high heat resistance over a broad range of compositions. In particular, the example compositions with cross-copolymers in the range of 20-95 wt % and polyphenylene ether resins in a range of 80-5 mass % had an A hardness in the range of 60-95, and in tensile tests, exhibited a break elongation of at least 50% and a break strength of at least 10 MPa. Additionally, they had a heat deformation resistance temperature of at least 130° C. and the temperature at which the residual elongation (δL) of samples reached 10% was at least 115° C., so the heat resistant thermoplastic elastomers excelled in softness, mechanical properties and heat resistance.

Furthermore, when the A hardness of the compositions was at least 70 and at most 90, the temperature at which the storage modulus E' by viscoelastic spectrum measurements fell to $10^6$ Pa was at least 120° C., and when the A hardness was at least 50 and less than 70, the temperature at which the storage modulus (E') observed by viscoelastic spectrum measurements (measurement frequency 1 Hz) fell to $10^6$ Pa was at least 140° C.

As shown in Example 11, by adding a plasticizer, the softness and fluidity (MFR) can be adjusted while retaining the heat resistance and mechanical properties.

Furthermore, according to the results of the Taber abrasion test, the compositions of the examples exhibited effects of the same level or superior to the cross-copolymers alone.

TABLE 5

| | | Co. Ex. 1 | Co. Ex. 2 | Co. Ex. 3 | Co. Ex. 4 | Co. Ex. 5 | TPV1 | TPV2 | TPV3 |
|---|---|---|---|---|---|---|---|---|---|
| Blend (mass pts.) | Polymer of Production Example 1 | 100 | 0 | 0 | 0 | 0 | | | |
| | Polymer of Production Example 2 | 0 | 100 | 0 | 0 | 0 | | | |
| | Polymer of Production Example 3 | 0 | 0 | 100 | 0 | 0 | | | |
| | Styrene-Ethylene Copolymer | 0 | 0 | 0 | 0 | 80 | | | |
| | Polyphenylene Ether YPX-100L | 0 | 0 | 0 | 100 | 20 | | | |
| | Antioxidant Irg1076 | 0.1 | 0.1 | 0.1 | 0.1 | 0 | | | |
| | Plasticizer Paraffin Processing Oil PW-90 | 0 | 0 | 0 | 0 | 0 | | | |
| Physical Property Test Results | MFR 260° C. Load 10 kg g/10 min | 6.9[5] | 2.3[5] | 15[5] | no flow | not mea | 13.5[5] | 21.2[5] | 8.3[5] |
| | A Hardness | 65 | 85 | 85 | not mea. | 84 | 70 | 80 | 72 |
| | Initial Tensile Elastic Modulus (MPa) | 5 | 31 | 37 | —[6] | 6.6 | 10.5 | 19.2 | 13.1 |
| | Break Elongation (%) | 1020 | 1260 | 580 | —[6] | 610 | 450 | 1264 | 498 |
| | Break Strength (MPa) | 20 | 42 | 16 | —[6] | 8.8 | 5.3 | 11 | 6.3 |
| | Heat Deformation Resistance Heat Deformation Temp | 110 | 100 | 105 | >180 | 80 | 170 | >180 | >180 |
| | Temp where Storage Elastic Modulus falls to $10^6$ Pa | 100 | 115 | 110 | 263 | 73 | 155 | 134 | 152 |
| | Temp where Storage Elastic Modulus falls to $10^5$ Pa | 138 | — | — | — | — | — | — | — |
| | Temp where Residual Elongation (δL) of Sample 10% | 107 | 105 | 110 | not mea. | 75 | 159 | 127 | —[7] |
| | Taber Abrasion Mass/mg H-22 Wear Disc | 100 | 90 | not mea. | not mea. | not mea. | 130 | 70 | 118 |

[5] MFR measurement conditions were 200° C., load 10 kg, g/10 min
[6] The sheet was too hard to punch through with measuring dumbbell so not measured.
[7] Breakage at less than 10% δL value.

The viscoelastic spectra of the compositions obtained in Examples 2, 3, 5 and 6 and Comparative Examples 1 and 4 are shown in the drawing FIG. 1.

The results of Examples 1-14 show that a composition comprising a cross-copolymer and a polyphenylene ether resin exhibits high heat resistance over a broad range of compositions.

Additionally, as shown in Example 8, a composition containing at least 5 mass % and less than 20 mass % of the cross-copolymer and 95-80 mass % of the polyphenylene ether resin exhibited a break elongation of up to 50%, thus having improved elongation/rigidity.

Examples 15-19

A thermoplastic resin composition was obtained in the following manner.

A total of about 45 g of the formulations (parts by mass) shown in Table 6 were kneaded at 250° C. and 100 rpm for 10 minutes to produce samples.

Ciba Specialty Chemicals Irganox 1076 was used as an antioxidant.

J-Plus D610A di-n-alkyl ($C_6$-$C_{10}$) adipate was used as a plasticizer.

An erucic acid amide from NOF was used as a lubricant.

As a photoprotectant, ADEKA LA36 (UV absorber) and LA77Y (hindered amine photostabilizer) mixed at a mass ratio of 1:1 was used.

A 1.0 mm thick sheet formed from the resulting composition by means of the above-described hot press method was then subjected to a rubbing abrasion test, a wire abrasion test, a Taber abrasion test using a CS-10 wear disc, a light resistance test using a fade meter and an oil resistance test.

<Rubbing Abrasion Test>

A 1 mm thick sheet was subjected to 10,000 reciprocal rubbings using No. 6 canvas and a load of 0.5 kg using a JSPS-type friction fastness tester (Tester Sangyo), after which the change in mass due to abrasions was measured and the surface was evaluated by eye and touch. When the sheet was worn through by the abrasion, the number of reciprocal rubbings to that point was recorded.

Abrasion Mass (mg)=Mass before abrasion test (mg)−Mass after abrasion test (mg)

| Eye/Touch Evaluations | |
|---|---|
| A | Smooth texture, with no apparent abrasion on surface |
| B | Some roughness to touch and abrasion visible on surface |
| C | Clear erosion of surface and troughs in abrasion surface, surface very rough. Or, sheet worn through in less than 10,000 repetitions. |

<Wire Abrasion Test>

During the above-described rubbing abrasion test, a 5 mmϕ copper wire was placed underneath the sheet, and the portion of the sheet raised by the wire was subjected to reciprocal rubbings using No. 6 canvas and a load of 0.5 kg, and the number of reciprocal rubbings until the sheet was worn through was recorded.

Samples that withstood 30,000 reciprocal rubbings were recorded as over 30,000 (>30000).

<CS-10 Taber Abrasion Test>

The test was performed in the same manner as the above-described test using an H-22 wear disc, except that the wear disc was changed to a CS-10 and the testing piece was a square testing piece of 1 mm, about 100 mm on a side.

After the abrasion test was completed, the abrasion surface was analyzed using a surface roughness meter (Mitsutoyo SJ-400), and the average roughness Ra (JIS B0601) was measured. Touch tests were also performed.

| Touch Evaluations | |
|---|---|
| A | Smooth texture |
| B | Some roughness to touch. |
| C | Surface erosion apparent to touch and eyes. |

<Light Resistance Test>

A 0.5 mm thick film formed by press-forming was tested with a fade meter (light source carbon arc lamp JIS D0205), under conditions of no shower, black panel temperature 83° C. and 500 hours. After the test, the samples were cut into strips, then subjected to tensile tests at a pulling rate of 500 mm/min using an Orientech Tensilon UCT-1T tensile tester compliant with JIS K-6251.

The resulting break strength and break elongation were compared with the values before the light resistance tests, and their retention rates were determined. A retention rate of 100% indicates absolutely no change occurred.

A break strength retention rate of less than 50% was marked "C".

<Oil Resistance Test>

A 1 mm thick sheet was immersed for 24 hours in paraffin oil (Kaneda Hicall K-350) set to 80° C., then the increase in mass due to swelling was measured.

Mass Increase Rate (%)= 100×(Mass after immersion−Mass before immersion)/Mass before immersion The results are shown in Table 6.

As Comparative Example 6, a commercially available SEBS (hydrogenated styrene-butadiene-styrene block copolymer) was used to obtain a thermoplastic resin composition in a similar manner with the blending ratios of Table 6 with PPE. The physical evaluation results are also shown in Table 6.

Additionally, physical evaluation results using the above-mentioned commercially available TPV1 and TPV2, a commercially available thermoplastic polyurethane (TPU; A hardness 80) and a commercially available hydrogenated styrene block copolymer/PPE compound (A hardness 76) are shown in Table 7.

TABLE 6

| | | Ex. 15 | Ex. 16 | Ex. 17 | Ex. 18 | Ex. 19 | Co. Ex. 6 |
|---|---|---|---|---|---|---|---|
| Blend (parts by mass) | Polymer of Production Example 1 | 90 | 80 | 0 | 0 | 0 | 0 |
| | Polymer of Production Example 3 | 0 | 0 | 90 | 0 | 0 | 0 |
| | Polymer of Production Example 4 | 0 | 0 | 0 | 90 | 85 | 0 |
| | Polyphenylene ether YPX-100L | 10 | 20 | 10 | 10 | 15 | 20 |
| | Antioxidant Irg1076 | 0.1 | 0.1 | 0.1 | 0.1 | 0.1 | 0.1 |
| | Plasticizer | 0 | 0 | 10 | 0 | 0 | 0 |
| | Hydrogenated petroleum resin P-115 | 0 | 0 | 0 | 0 | 10 | 0 |
| | Lubricant | 0.2 | 0 | 0.2 | 0 | 0.2 | 0 |
| | Photoprotective agent | 1.0 | 1.0 | 1.0 | 1.0 | 1.0 | 1.0 |
| | SEBS | 0 | 0 | 0 | 0 | 0 | 80 |

TABLE 6-continued

|  |  |  | Ex. 15 | Ex. 16 | Ex. 17 | Ex. 18 | Ex. 19 | Co. Ex. 6 |
|---|---|---|---|---|---|---|---|---|
| Physical Property Test Results | A hardness | | 70 | 79 | 82 | 72 | 77 | 91 |
| | Rubbing abrasion canvas load 0.5 kg 10,000 reps | mass mg | 12 | 3 | 1 | 6 | 6 | 122 |
| | | appearance | B (rough) | A (smooth) | A (smooth) | B (rough) | A (smooth) | C (erosion) |
| | Wire Abrasion canvas load 500 g reps to wear through | reps | >30000 | >30000 | >30000 | >30000 | >30000 | 2800 |
| | Taber Abrasion CS-10 surface avg. roughness | microns | 0.62 | 0.61 | 0.43 | 0.54 | 0.6 | 0.54 |
| | | touch | B | B | A | B | B | B |
| | Light resistance test Fade meter 500 h | break strength ret % | 100 | 100 | 100 | 90 | 90 | not meas. |
| | | break elong. ret % | 90 | 95 | 90 | 95 | 90 | not meas. |
| | Oil resistance Paraffin oil 80° C. 24 hr | mass increase % | 42 | 31 | 18 | 43 | 35 | 119 (surface dissolved) |

TABLE 7

|  |  |  | TPV1 | TPV2 | TPU | 9) |
|---|---|---|---|---|---|---|
| Physical Property Test Results | A hardness | | 70 | 80 | 80 | 76 |
| | Rubbing abrasion canvas load 0.5 kg 10,000 reps | mass mg | 290 | 57 | Worn through after 205 reps | 264 |
| | | appearance | C (erosion) | C (very rough) | C (worn thru) | C (erosion) |
| | Wire Abrasion canvas load 500 g reps to wear through | reps | 4500 | 10760 | 2020 | 2300 |
| | Taber Abrasion CS-10 surface avg. roughness | microns | 0.80 | 0.30 | 0.21 | 0.65 |
| | | touch | C | A | A | B |
| | Light resistance test Fade meter 500 h | break strength ret % | not meas. | x < 10, high deterioration[8] | not meas. | not meas. |
| | | break elong. ret % | not meas. | x < 10, high deterioration[8] | not meas. | not meas. |
| | Oil resistance Paraffin oil 80° C. 24 hr | mass increase % | 82 (swelling) | 51 (swelling) | 3 | C (surface dissolved) |

[8] Stickiness on surface
[9] Hydrogenated styrene block copolymer/PPE compound

The resin composition obtained in present Example 12 was formed into a sheet of thickness 0.5 mm by a hot press method (temperature 250° C., time 5 minutes, pressure 50 kg/cm²), and its dielectric constant and dielectric loss were measured by the methods described below. Measurements were performed in compliance with the RF-IV process, using an Agilent Technologies RF impedance/material analyzer HP4291A as the measuring device, in the range of measurement frequencies 1 MHz to 1 GHz. As a result, the dielectric constant was found to be 2.56 and the dielectric loss (tan δ) was found to be 0.003 at 25° C. and 1 GHz.

The resin compositions of Examples 15-19 (photoprotective agent added) were all confirmed to exhibit good light resistance, and to have good rubbing abrasion resistance and wire abrasion resistance compared to the TPV and TPU as comparative examples.

In the Taber abrasion test using CS-10 wear discs and the oil resistance tests for paraffin oil, they exhibited good results in comparison with TPV.

Additionally, the SEBS/PPE compositions had a relatively high A hardness and were inferior in terms of oil resistance and scratch-abrasion resistance.

The invention claimed is:
1. A thermoplastic resin composition comprising 5-99 mass % of a cross-copolymer, and 95-1 mass % of a polyphenylene ether resin; and satisfying the following conditions (1) to (4):
(1) being produced by a production method comprising a coordination polymerization step of performing copolymerization of an olefin monomer, an aromatic vinyl compound monomer and an aromatic polyene using a single-site coordination polymerization catalyst to synthesize an olefin-aromatic vinyl compound-aromatic polyene copolymer, and a cross-polymerization step of using an anionic polymerization initiator or radical polymerization initiator to polymerize the synthesized olefin-aromatic vinyl compound-aromatic polyene copolymer with an aromatic vinyl compound monomer;
(2) the composition of the olefin-aromatic vinyl compound-aromatic polyene copolymer obtained in the coordination polymerization step being such as to have an aromatic vinyl compound content of at least 5 mol % and at most 40 mol %, and an aromatic polyene content at least 0.01 mol % and at most 0.3 mol %, the balance being olefin content;
(3) the single-site coordination polymerization catalyst used in the coordination polymerization step being constituted of a co-catalyst and a transition metal compound represented by the following general formula (1):

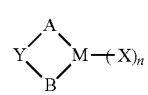

general formula (1)

wherein,
A and B may be identical or different, and are groups chosen from among non-substituted or substituted benzoindenyl groups, non-substituted or substituted indenyl groups, non-substituted or substituted cyclopentadienyl groups and non-substituted or substituted fluorenyl groups;

Y is a methylene group having bonds with A and B, and also having, as substituent groups, a hydrogen or hydrocarbon group optionally including 1-3 nitrogen, oxygen, sulfur, phosphorus or silicon atoms and having 1-15 carbon atoms, the substituent groups optionally being identical or different, and Y optionally having a cyclic structure;

X is a hydrogen, a hydroxyl group, a halogen, a hydrocarbon group having 1-20 carbon atoms, an alkoxy group having 1-20 carbon atoms, a silyl group having a hydrocarbon substituent group with 1-4 carbon atoms, or an amido group having a hydrocarbon substituent group with 1-20 carbon atoms, and if there are a plurality of X's, the X's may be bonded together;

n is the integer 1 or 2; and

M is zirconium, hafnium or titanium;

or by the following general formula (2):

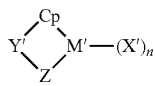

general formula (2)

wherein,

Cp is a group chosen from among non-substituted or substituted cyclopentaphenanthryl groups, non-substituted or substituted benzoindenyl groups, non-substituted or substituted cyclopentadienyl groups, non-substituted or substituted indenyl groups, and non-substituted or substituted fluorenyl groups;

Y' is a methylene group, a silylene group, an ethylene group, a germylene group or a boron residue having bonds with Cp and Z, and also having a hydrogen or a hydrocarbon group with 1-15 carbon atoms, the substituent groups optionally being identical or different, and Y' optionally having a cyclic structure;

Z is a ligand comprising nitrogen, oxygen or sulfur, coordinated with M' via the nitrogen, oxygen or sulfur, having a bond with Y' and also having a hydrogen or a substituent group with 1-15 carbon atoms;

M' is zirconium, hafnium or titanium;

X' is a hydrogen, a halogen, an alkyl group having 1-15 carbon atoms, an aryl group having 6-10 carbon atoms, an alkylaryl group having 8-12 carbon atoms, a silyl group having a hydrocarbon substituent group with 1-4 carbon atoms, an alkoxy group having 1-10 carbon atoms, or a dialkylamido group having an alkyl substituent group with 1-6 carbon atoms; and n is an integer 1 or 2; and (4) the proportion by mass of the olefin-aromatic vinyl compound-aromatic polyene copolymer obtained in the coordination polymerization step with respect to the cross-copolymer obtained in the cross-copolymerization step being 50-95 mass %.

2. A molded article comprising the thermoplastic resin composition according to claim 1.

3. A film comprising the thermoplastic resin composition according to claim 1.

4. A skin material consisting of the film according to claim 3.

5. A synthetic leather consisting of the film according to claim 3.

6. A tape substrate consisting of the film according to claim 3.

7. An electrical wire sheath material consisting of the film according to claim 3.

8. A gasket consisting of the thermoplastic resin composition according to claim 1.

9. A thermoplastic resin composition as claimed in claim 1, wherein the aromatic vinyl compound monomer used in the coordination polymerization step and the aromatic vinyl compound monomer used in the cross-copolymerization step are the same.

10. A thermoplastic resin composition as claimed in claim 9, wherein the olefin monomer is ethylene, the aromatic vinyl compound monomer is styrene, and the aromatic polyene is one or a mixture of two or more of ortho-divinylbenzene, para-divinylbenzene and meta-divinylbenzene.

11. A thermoplastic resin composition as claimed in claim 1, wherein the proportion by mass of the olefin-aromatic vinyl compound-aromatic polyene copolymer obtained in the coordination polymerization step with respect to the cross-copolymer obtained in the cross-copolymerization step being 60-90 mass %.

* * * * *